United States Patent
Nakano

(10) Patent No.: US 9,451,615 B2
(45) Date of Patent: Sep. 20, 2016

(54) WIRELESS COMMUNICATION SYSTEM AND WIRELESS COMMUNICATION DEVICE

(75) Inventor: Hisao Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 114 days.

(21) Appl. No.: 14/377,446

(22) PCT Filed: May 10, 2012

(86) PCT No.: PCT/JP2012/003062
§ 371 (c)(1),
(2), (4) Date: Aug. 7, 2014

(87) PCT Pub. No.: WO2013/168197
PCT Pub. Date: Nov. 14, 2013

(65) Prior Publication Data
US 2015/0023271 A1    Jan. 22, 2015

(51) Int. Cl.
*H04W 72/04* (2009.01)
*H04W 16/14* (2009.01)
*H04W 36/08* (2009.01)
*H04W 84/12* (2009.01)
*H04W 36/20* (2009.01)

(52) U.S. Cl.
CPC ......... *H04W 72/0453* (2013.01); *H04W 16/14* (2013.01); *H04W 36/08* (2013.01); *H04W 36/20* (2013.01); *H04W 84/12* (2013.01)

(58) Field of Classification Search
CPC ........... H04W 4/006; H04W 28/0226; H04W 36/00; H04W 72/0453
See application file for complete search history.

(56) References Cited

U.S. PATENT DOCUMENTS

2006/0281461 A1* 12/2006 Kwun et al. .................. 455/436
2008/0002624 A1    1/2008 Yasumoto
(Continued)

FOREIGN PATENT DOCUMENTS

JP    2009-100210 A    5/2009
JP    2010-258621 A    11/2010
(Continued)

OTHER PUBLICATIONS

Office Action issued in Japanese Patent Application No. 2014-514232 dated May 27, 2014.

*Primary Examiner* — Benjamin H Elliott, IV
(74) *Attorney, Agent, or Firm* — Birch, Stewart, Kolasch & Birch, LLP

(57) ABSTRACT

A wireless communication system includes APs 1 and 2 that perform communications using different frequency channels, and slave units 3 to 5 that connect with either one of the APs 1 and 2 to perform wireless communications. When detecting a radar wave which is a wireless signal of another wireless system, and stopping the communications which have been performed till then via a frequency channel, the AP1 commands the slave units 3 to 5 that have been performing wireless communications by using this frequency channel to switch their connection destinations to the AP 2 that performs communications using a different frequency channel, and the slave units 3 to 5 switch their connection destinations to the AP 2 according to the command from the AP 1.

6 Claims, 3 Drawing Sheets

(56) References Cited

U.S. PATENT DOCUMENTS

| | | | |
|---|---|---|---|
| 2008/0037469 A1* | 2/2008 | Hamilton et al. | 370/331 |
| 2010/0103850 A1 | 4/2010 | Gossain et al. | |
| 2011/0007689 A1 | 1/2011 | Shen et al. | |
| 2011/0116415 A1 | 5/2011 | Naito et al. | |
| 2012/0008596 A1* | 1/2012 | Jung et al. | 370/331 |
| 2012/0244864 A1 | 9/2012 | Fujii | |
| 2015/0023271 A1* | 1/2015 | Nakano | 370/329 |

FOREIGN PATENT DOCUMENTS

| | | |
|---|---|---|
| JP | 2011-15048 A | 1/2011 |
| JP | 2011-503942 A | 1/2011 |
| JP | 2012-84946 A | 1/2011 |
| JP | 2011-124980 A | 6/2011 |
| JP | 2011-146945 A | 7/2011 |
| WO | WO 2011/074118 A1 | 6/2011 |

* cited by examiner

WIRELESS COMMUNICATION SYSTEM AND WIRELESS COMMUNICATION DEVICE

FIELD OF THE INVENTION

The present invention relates to a wireless communication system that shares a frequency band with another wireless system, and a wireless communication device.

BACKGROUND OF THE INVENTION

A wireless LAN (Local Area Network) in a 5 GHz band shares a frequency band with a radar system such as a weather radar. It is mandatory to mount a DFS (Dynamic Frequency Selection) function in a wireless LAN system as a sharing condition.

In the DFS function, it is necessary to check whether or not a radar wave is detected before starting communications on each frequency channel (for example, after the system is powered on or after channel switching) for one minute, and communications cannot be performed on the frequency channel during this check. Further, when a radar wave is detected during communications, it is necessary to stop the use of the frequency channel which has been used for the communications till then, and switch to another frequency channel.

In the above-mentioned case, even if the switching to another frequency channel is carried out in order to continue the communications which have been performed till then, the one-minute checking of radar wave detection must be performed also on the frequency channel which is the switching destination, and the communications are suspended during the check. When a radar wave is detected also for the frequency channel which is the switching destination, it is necessary to further switch to another frequency channel, and therefore there is a possibility that the suspension of the communications becomes still longer. Various technologies have been proposed in order to solve this problem associated with convenience.

For example, in a device described in patent reference 1, a wireless LAN access point has a plurality of wireless interfaces, and, when communications in one wireless interface are stopped because of detection of a radar wave, or the like, communications are provided via another wireless interface.

Further, in a wireless communication device described in patent reference 2, a wireless LAN access point is provided with a plurality of wireless units each having a function of detecting a radar wave and a data communication function, and, when performing channel switching, one wireless unit temporarily performs a data communication operation and another wireless unit operates in parallel with the wireless unit so as to detect a radar wave.

RELATED ART DOCUMENT

Patent Reference

Patent reference 1: Japanese Unexamined Patent Application Publication No. 2009-100210
Patent reference 2: Japanese Unexamined Patent Application Publication No. 2011-146945

SUMMARY OF THE INVENTION

Problems to be Solved by the Invention

A problem with the conventional technologies is that because a plurality of wireless interfaces or a plurality of wireless units are needed for one wireless LAN access point, the number of components including wireless components and antenna components increases unavoidably, and therefore the cost, the mounting space, and the power consumption increase.

The present invention is made in order to solve the above-mentioned problem, and it is therefore an object of the present invention so provide a wireless communication system and a wireless communication device having a simple structure, and capable of, even when a wireless signal of another wireless system which shares a frequency band is detected during communications, continuing the communications while maintaining the sharing condition of the frequency band.

Means for Solving the Problem

In accordance with the present invention, there is provided a wireless communication system that shares a frequency band with another wireless system, the wireless communication system including: wireless communication devices of a plurality of master stations that perform communications using different frequency channels; and a wireless communication device of a slave station that connects with either one of the wireless communication devices of the plurality master stations, and performs wireless communications, in which when detecting a wireless signal of the other wireless system and stopping communications which has been being performed till then via a frequency channel, the wireless communication device of the master station commands the wireless communication device of the slave station which has been performing wireless communications by using this frequency channel to switch its connection destination to the wireless communication device of another master station that performs communications using a different frequency channel, and the wireless communication device of the slave station switches its connection destination to the wireless communication device of the other master station according to the command from the wireless communication device of the master station.

Advantages of the Invention

According to the present invention, there is provided an advantage of being able to continue communications while maintaining the sharing condition of the frequency band even when a wireless signal of the other wireless system, which shares the frequency band with the wireless communication system, is detected during communications by using the simple structure.

EMBODIMENTS OF THE INVENTION

Hereafter, in order to explain this invention in greater detail, the preferred embodiments of the present invention will be described with reference to the accompanying drawings.

Embodiment 1

Figure 1:
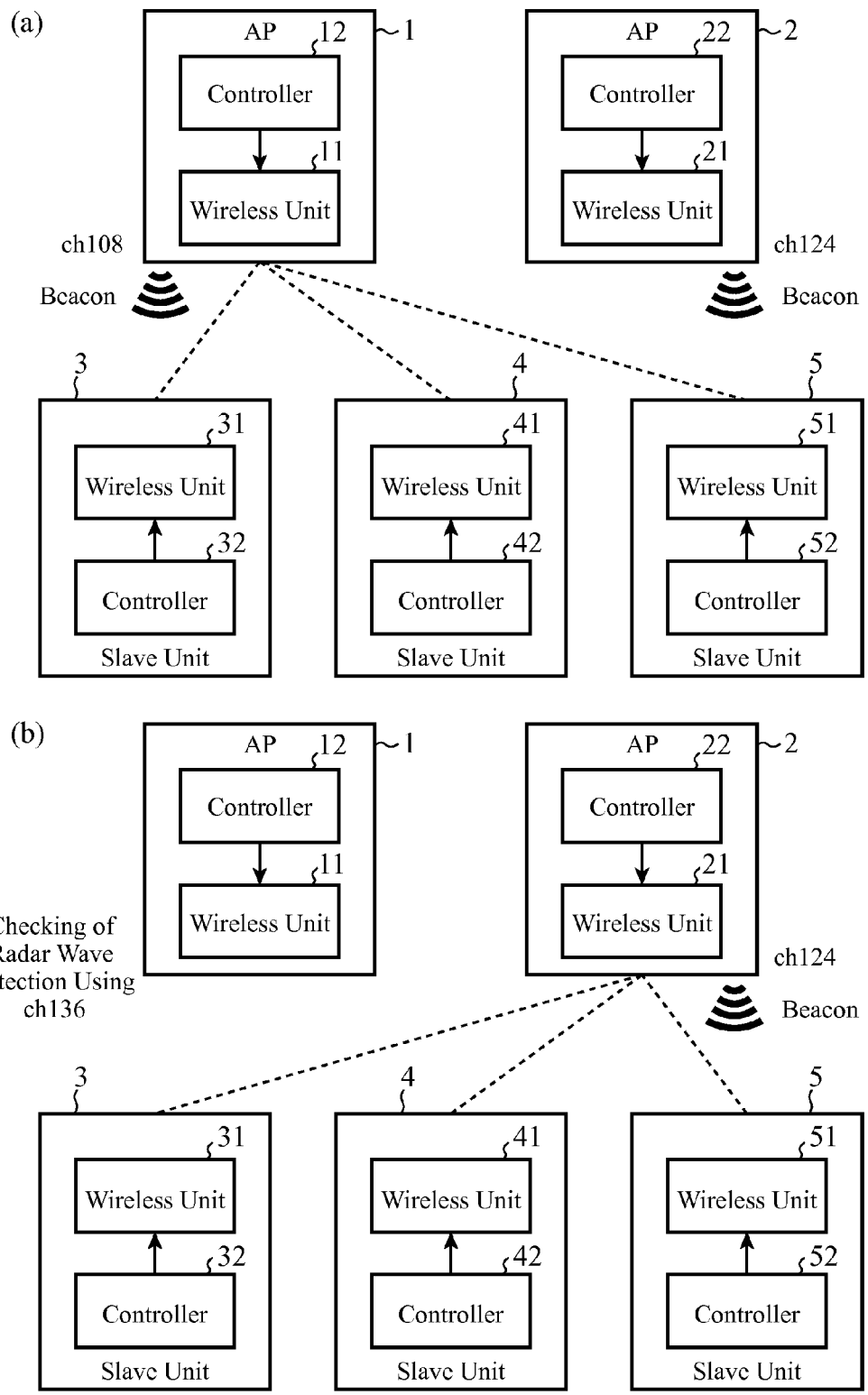
FIG. 1 is a view showing a wireless communication system in accordance with Embodiment 1 of the present invention.

FIG. 1 is a view showing a wireless communication system in accordance with Embodiment 1 of the present invention. In this embodiment, a case in which the wireless communication system shown in FIG. 1 is a wireless LAN system mounted in a moving object, such as a vehicle, in which the frequency of a carrier falls within a 5 GHz band is shown. Further, as another wireless system that shares the frequency band with this wireless LAN system, a radar system, such as a weather radar, is provided.

The wireless LAN system in accordance with the present invention carries out communications via an access point (described as an AP from here on) which is a base station (master station) that controls other wireless communication devices as slave units (slave stations).

In FIG. 1, a wireless LAN system which is structured to include two APs 1 and 2 and slave units 3 to 5 is shown. For example, the slave units 3 to 5 are communication devices of a vehicle-mounted navigation device and display monitors (a monitor placed in an instrument panel and a monitor for backseats). Further, each of the slave units 3 to communicates with a camera (not shown), such as a vehicle-mounted rear camera which communicates and connects, via cable or radio, with the AP 1 or 2, under the control of the AP 1 or 2.

The APs 1 and 2 and the slave units 3 to 5 are provided with wireless units and controllers, respectively.

The wireless units 11, 21, 31, 41, and 51 are functional blocks each performing wireless communications. For example, each of the wireless units includes an antenna unit that transmits and receives a wireless signal, an RF processing unit that processes a high frequency signal received, and a baseband processing unit that extracts a signal which can be processed by the controller from the wireless signal processed by the RF processing unit.

The controllers 12, 22, 32, 42, and 52 are functional blocks each controlling the communications by the wireless unit. The controllers 12 and 22 with which the APs are respectively provided control the wireless units 11 and 12 respectively to relay communications between the slave units 3 to 5 and communications partners, such as the above-mentioned camera. Further, the controllers 32, 42, and 52 with which the slave units 3 to 5 are respectively provided control the wireless units 31, 41, and 51 respectively to perform communications with the AP 1 or 2.

In the wireless LAN system shown in FIG. 1, a DFS function is mounted as a sharing condition in order to share a frequency band with the radar system.

Conventionally, when the vehicle moves to a radar available area of the radar system while an AP communicates with a slave unit, and this AP detects a radar wave (radar wave signal), the frequency channel via which the API has been communicating with the slave unit till then by using the DFS function becomes unusable. At this time, although the AP switches to another frequency channel in order to continue the communications with the slave unit, the AP must perform checking of radar wave detection for one minute also via the frequency channel to which the AP has switched, and therefore the communications with the slave unit are suspended during that time.

Further, when the AP detects a radar wave also for the frequency channel to which the AP has switched, the AP further needs to switch to another frequency channel, and therefore there is a possibility that the suspension of the communications becomes still longer.

In an environment in which a plurality of radar waves are used, there is a case in which the AP needs to perform checking of radar wave detection via a plurality of frequency channels by the time the AP finds a frequency channel for which no radar wave is detected in the selection of a frequency channel before communications are started, and it takes a long time for the AP to start communications.

To solve this problem, in the wireless LAN system in accordance with Embodiment 1, when an AP communicating with a slave unit detects a radar wave, the AP makes a request of the slave unit which has belonged to the AP itself till then to switch its connection destination to another AP which is operating on another frequency channel, and the slave unit switches its connection destination to the other AP according to this request. An outline of this operation will be explained by using FIG. 1.

In the example shown in FIG. 1(a), the AP 1 operates on a channel ch108, the AP 2 operates on a channel ch124, and the slave units 3 to 5 perform communications via the AP 1 on the channel ch108.

Further, she APs 1 and 2 always perform checking of radar wave detection while performing communications via different frequency channels as mentioned above. When the AP 1 detects a radar wave via the channel ch108 in this state, the AP commands each of the slave units 3 to 5 belonging to the AP itself to switch its connection destination to the AP 2 operating on the other frequency channel (ch124). Each of the slave units 3 to 5 switches its connection destination to the AP 2 according to the command from the AP 1, as shown in FIG. 1(b).

By doing in this way, each of the slave units 3 to 5 can continue the communications even if the AP 1 detects a radar wave.

Next, the operation of the wireless communication system will be explained.

Figure 2:
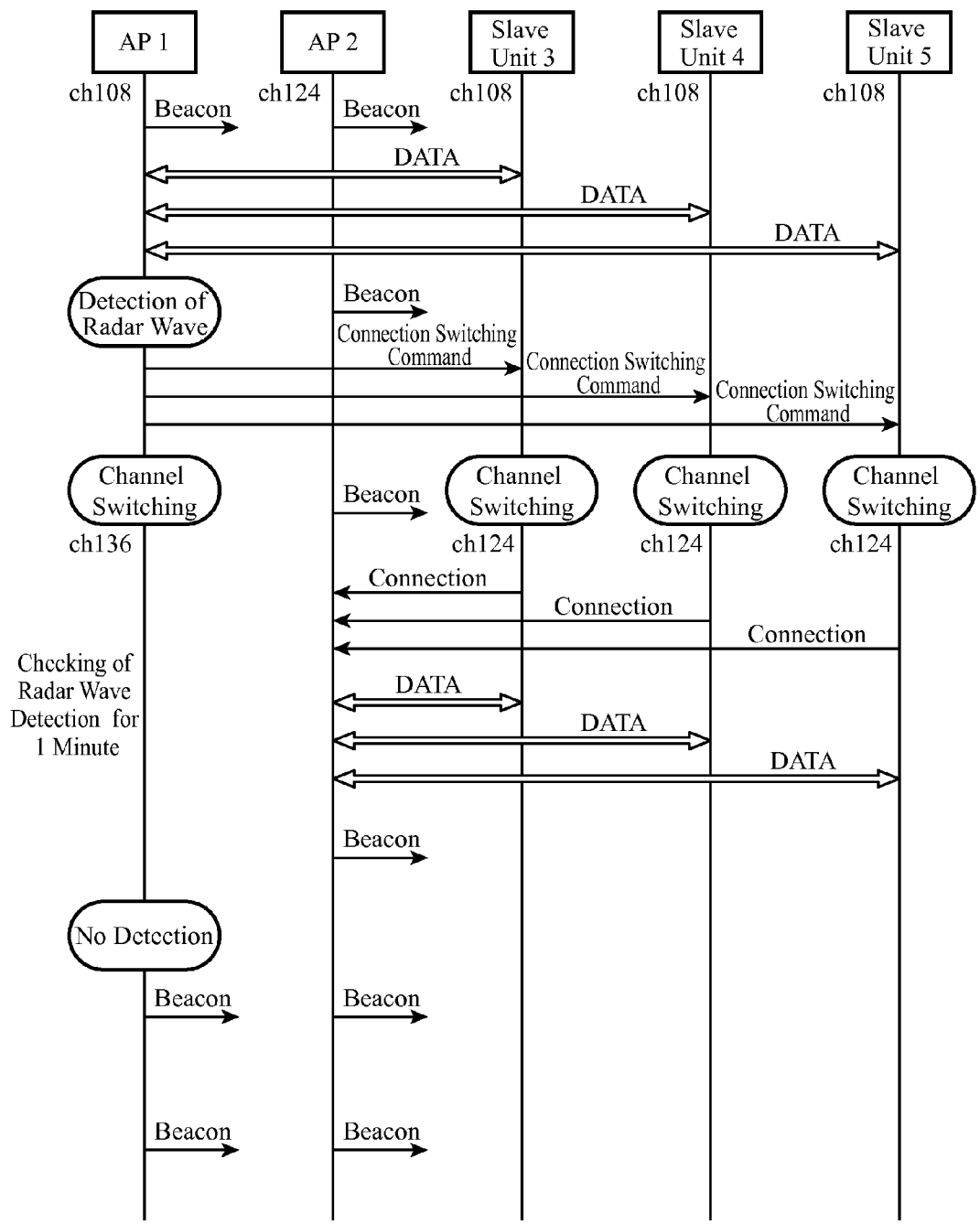
FIG. 2 is a timing chart showing an operation procedure of the wireless communication system in accordance with Embodiment 1.

FIG. 2 is a timing chart showing an operation procedure of the wireless communication system in accordance with Embodiment 1, and the details of the system operation when an AP detects a radar wave in the wireless communication system shown in FIG. 1 will be mentioned below.

Each of the APs 1 and 2 transmits a beacon signal periodically, and the APs operate on different channels. The AP 1 operates on the channel ch108, and the AP 2 operates on the channel ch124. Further, before detecting a radar wave, the AP 1 has been communicating with the slave units 3 to 5 via the channel ch108.

Next, when the wireless unit 11 of the AP 1 detects a radar wave, the controller 12 of the AP 1 generates information about a command for changing the connection to connection with the AP 2 which is operating on the other frequency channel, and transmits the information to the slave units 3 to 5 via the wireless unit 11.

When the wireless units 31, 41, and 51 of the slave units 3 to 5 receive the above-mentioned command information, the controllers 32, 42, and 52 of the slave units 3 to 5 switch their connection destinations to the AP 2 according to the command from the AP 1.

More specifically, each of the slave units 3 to 5 switches to the channel ch124, and communicates and connects with the AP 2. As a result, the slave units 3 to 5 can continue their communications.

The AP 1 which has issued the connection switch command performs channel, switching to the channel ch136 which is another channel because the channel ch108 is made to become unusable by the DFS function, and performs checking of radar wave detection for 1 minute. As a result, if no radar wave is detected, the AP 1 transmits a beacon signal and then shifts to a state in which the AP 1 can communicate.

As mentioned above, the communication system according to this Embodiment 1 is provided with the APs 1 and 2 that perform communications using different frequency channels, and the slave units 3 to 5 that connect with either one of the APs 1 and 2 to perform wireless communications, and, when detecting a radar wave which is a wireless signal of another wireless system, and stopping the communications which have been performed till then via a frequency channel, the API commands the slave units 3 to 5 that have been performing wireless communications by using this frequency channel to switch their connection destinations to the AP 2 that performs communications using a different frequency channel, and the slave units 3 to 5 switch their connection destinations to the AP 2 according to the command from the AP 1. Because the communication system are constructed this way, even in a case in which one AP detects a radar wave during communications and channel switching is needed, the slave units 3 to 5 can continue communications without suspending the communications by switching their connection destinations to the AP 2 that is operating on another channel.

Embodiment 2

In this Embodiment 2, a plurality of APs which construct a wireless communication system share at least one of their respective pieces of communication channel information and radar wave detection channel information with one another. As a result, in the case of sharing the pieces of communication channel information, when selecting a channel, a channel other than the communication channels of other APs is selected, and, in the case of sharing the radar wave detection channel information, when making a channel selection, a channel is selected while the channel of the information is prevented from being selected.

Because the wireless communication system in accordance with Embodiment 2 has the same structure as that explained by using FIG. 1 in above-mentioned Embodiment 1, the system structure will be explained with reference to FIG. 1 in the subsequent explanation.

It is assumed that the wireless communication system in accordance with Embodiment 2 is a wireless LAN system mounted in a moving object, such as a vehicle, in which the frequency of a carrier fails within a 5 GHz band, and another wireless system that shares the frequency band with this wireless LAN system is a radar system, such as a weather radar.

Next, the operation of the wireless communication system will be explained.

Figure 3:
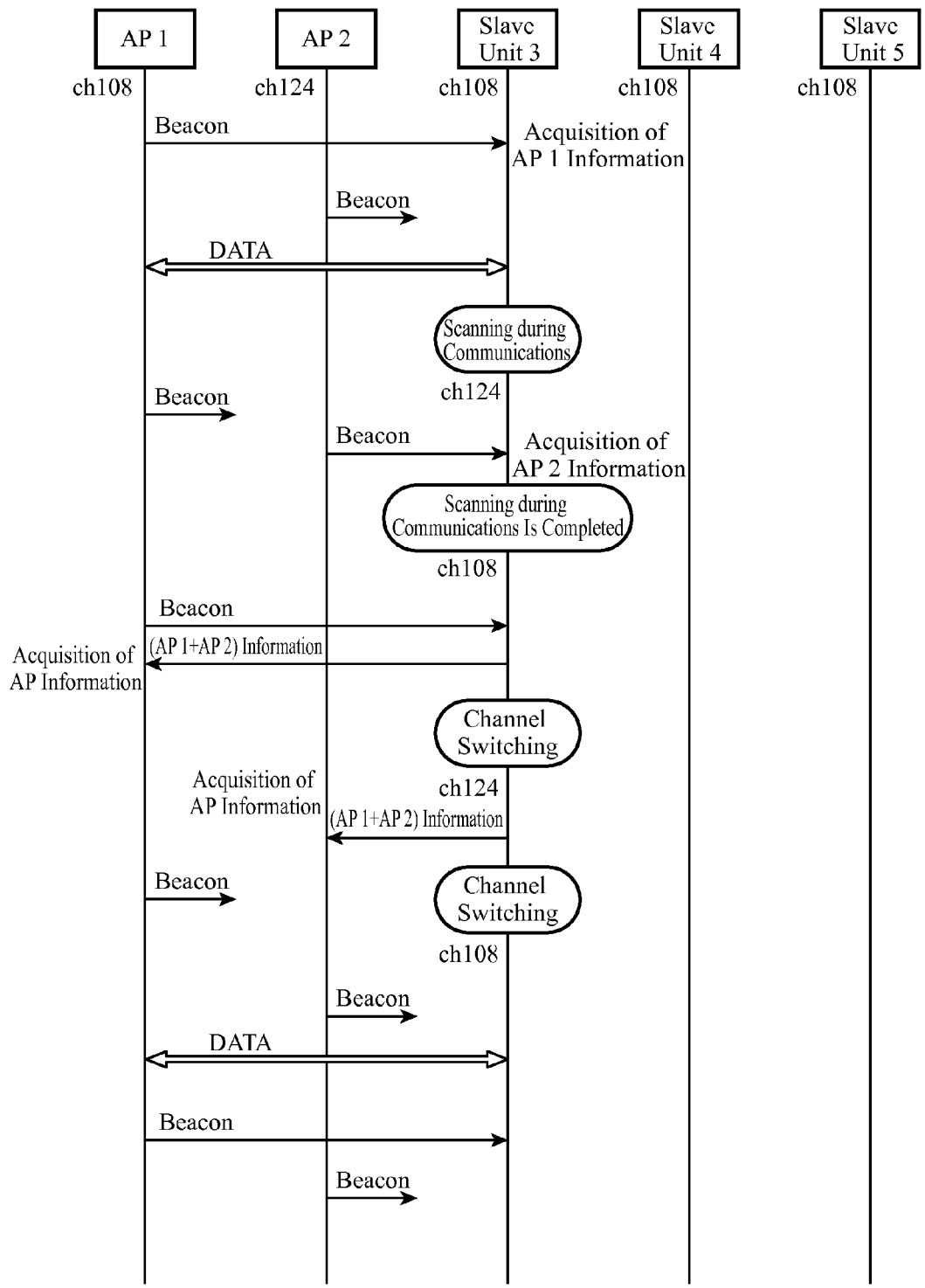
FIG. 3 is a timing chart showing an operation procedure of a wireless communication system in accordance with Embodiment 2 of the present invention.

FIG. 3 is a timing chart showing an operation procedure of the wireless communication system in accordance with Embodiment 2, and the details of the system operation when the APs share their respective pieces of information with one another will be mentioned below.

When detecting a radar wave, each of controllers 12 and 22 of the APs 1 and 2 stores radar wave detection channel information showing the frequency channel via which the radar wave is detected.

The APs 1 and 2 and slave units 3 to 5 which construct the wireless communication system define a unique information element (described as IE from here on) in common for the entire wireless communication system. A wireless unit 11 of the AP stores communication channel information showing its communication channel, and, when having detected a radar wave, the above-mentioned radar wave detection channel information in the defined IE, and embeds this IE in a beacon signal and transmits this beacon signal. Further, a wireless unit 21 of the AP 2 similarly stores communication channel information showing its communication channel, and, when having detected a radarwave, the above-mentioned radar wave detection channel information in the defined IE, and embeds this IE in a beacon signal and transmits this beacon signal. Each of the APs 1 and 2 transmits the beacon signal periodically.

A wireless unit 31 of the slave unit 3 receives the beacon signal from she AP 1, and acquires AP information (including at least one of the communication channel information of the AP 1, and the radar wave detection channel information) Because the beacon signal from the AP1 which is the connection destination has the same operating frequency as the slave unit 3, the beacon signal can be received periodically. As a result, the slave unit 3 acquires at least one of the communication channel information of the AP 1, and the radar wave detection channel, information.

Further, the beacon signal from the AP 2 is received by the wireless unit 31 of the slave unit 3 by periodically performing channel scanning during communications with the AP 1. More specifically, as shown in FIG. 3, when performing the scanning while switching among channels in order during communications with the AP 1 via a channel ch108, and then detecting the AP 2 with the scanning via a channel ch124, the wireless unit 31 of she slave unit 3 receives the beacon signal of the AP 2 and acquires at least one of the communication channel information of the AP 2 and the radar wave detection channel information which is included in this beacon signal.

When receiving the beacon signal from the AP 2, the slave unit 3 repeats the channel scanning until acquiring the AP information about all APs other than the AP 1 which is the connection destination of the communications.

More specifically, when starting the channel scanning during communications, the slave unit enters a state in which it switches among channels in order and waits for reception of a beacon signal within a predetermined time period. When receiving a beacon signal, the slave unit checks whether or not the unique IE is included in the beacon signal. At this time, when the unique IE is included in the beacon signal, the slave unit determines that the AP is the one which constructs the wireless communication system. When a timeout occurs, the slave unit switches to the next channel. After repeating the above-mentioned operation on up to the last channel, the slave unit ends the scanning operation.

There is a case in which the slave unit cannot recognize all the APs which construct the wireless communication system until completing the scanning of all the channels, and an AP is added during the channel scanning. Therefore, even if detecting the AP 2 as mentioned above, the slave unit repeats the channel scanning succeedingly.

When receiving each of the pieces of AP information about the APs 1 and 2, the wireless unit 31 of the slave unit 3 generates AP information ((AP 1+AP 2) information) which is a combination of at least one of the communication channel information of the AP 1 and the radar wave detection channel information which is included in the AP information about the AP 1 and at least one of the communication channel information of the AP 2 and the radar wave detection channel information which is included in the AP information about the AP 2.

Next, the wireless unit 31 of the slave unit 3 transmits the generated AP information to the AP 1 which is the connection destination of the communications, and temporarily switches the frequency channel from the channel ch108 to the channel ch124 used by the AP 2 and transmits the above-mentioned generated AP information to the AP 2, as shown in FIG. 3. After transmitting the AP information to the AP 2, the wireless unit 31 of the slave unit 3 performs a channel, switching operation of returning the connection destination of the communications to the channel ch108 used by the AP 1, and restarts the communications with the AP 1.

Each slave unit relays the AP information to allow the APs to share their respective pieces of AP information with one another, as mentioned above, so that the APs 1 and 2 can share the communication channel information showing the frequency channel via which each API is communicating and the radar wave detection channel information showing the frequency channel via which each API detects a radar wave with each other. As a result, even in a case in which a vehicle equipped with the wireless LAN system in accordance with this Embodiment 2 moves, and the detecting situation of detecting a radar wave changes from moment to moment, the information about their respective communication channels can be always shared, and it is possible to select different frequency channels when there occurs a necessity to perform channel switching. It can also be possible to prevent, a frequency channel via which a radar wave is detected from being selected.

As mentioned above, because the APs 1 and 2 share their respective pieces of communication channel information with each other, the pieces of communication channel information each showing at least one of the frequency channel via which the AP is communicating and the frequency channel via which a radar wave is detected, according to this Embodiment 2, the APs 1 and 2 can perform checking of radar wave detection while communicating via different frequency channels on the basis of the pieces of communication channel information. As a result, APs that operate on different frequency channels for which checking of radar wave detection has been completed in advance can be prepared, and, even when channel switching occurs, no checking of radar wave detection is required.

Further, by making the radar wave detection channel information be shared between the APs 1 and 2, setting to the channel can be prevented. As a result, the probability of detection of a radar wave decreases, and therefore a selection of a channel can be made efficiently.

Further, because the APs 1 and 2 share their respective pieces of communication channel information through a relay of the pieces of communication channel n formation by a slave unit according to this Embodiment 2, the APs can share the pieces of communication channel information by using a slave unit which is an existing device.

In addition, in above-mentioned Embodiments 1 and 2, each slave unit can change its role to an AP according to a communication condition. For example, when wireless communications which the slave unit 3 performs with the AP 1 after connecting with the AP are completed and the communication connection becomes unnecessary, the slave unit 3 changes its role from a slave unit to an IF and becomes an AP 3. By doing this way, an AP that can perform communications when performing channel switching can be prepared according to a communication condition.

In contrast, an AP to which no slave unit belongs can be made to change its role from an AP to a slave unit, and can be made to connect with another AP to communicate with this AP. For example, when wireless communications of a slave unit are completed and communications with the AP 2 become unnecessary, the AP changes its role from an AP to a slave unit. As a result, also an AP that is being prepared as a candidate for communication connection destination can perform communications.

By thus changing the role of a wireless communication device with flexibility, a wireless communication system whose structure can be changed according to various communication conditions can be provided.

Further, in above-mentioned Embodiments 1 and 2, all the APs 1 and 2 that construct the wireless communication system can be made to simultaneously perform checking of radar wave detection before starting their communications.

By doing this way, when one of the APs which construct the wireless communication system detects a radar wave, it is possible to perform a start of communications by using an AP that has not detected the radar wave. As a result, even in an environment in which a radar is made to operate on a plurality of channels, the probability of switching among channels in order and repeating checking of radar wave detection can be lowered, and therefore the time required to make a channel selection can be shortened.

While the present invention has been described in its preferred embodiments, it is to be understood that an arbitrary combination of two or more of the above-mentioned embodiments can be made, various-changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

Because the wireless communication system in accordance with the present invention can continue, communications while maintaining the sharing condition of a frequency band even when a wireless signal of another wireless system, which shares the frequency band with the wireless communication system, is detected during communications by using a simple structure, the wireless communication system is suitable for use as a vehicle-mounted wireless communication system that may enter the communication ranges of various wireless communication systems as the vehicle moves.

EXPLANATIONS OF REFERENCE NUMERALS

1 and 2 access point (AP), 3 to 5 slave unit, 11, 21, 31, 41, and 51 wireless unit, 12, 22, 32, 42, and 52 controller.

The invention claimed is:

1. A wireless communication system that shares a frequency band with another wireless system, said wireless communication system comprising:
   wireless communication devices of a plurality of master stations that perform communications using different frequency channels; and
   a wireless communication device of a slave station that connects with either one of the wireless communication devices of said plurality of master stations, and performs wireless communications, wherein
   when detecting a wireless signal of said other wireless system and stopping communications which has been being performed till then via a frequency channel, the wireless communication device of a master station commands the wireless communication device of said slave station which has been performing wireless communications by using this frequency channel to switch its connection destination to the wireless communication device of another master station that performs communications using a different frequency channel, and the wireless communication device of said slave station switches its connection destination to the wireless communication device of said other master station according to the command from the wireless communication device of said master station, and wherein the wireless communication device of said master station transmits communication channel information, which shows a frequency channel used for communications of its own device and a frequency channel through which the wireless signal of said other wireless system is detected, to the wireless communication device of said slave station, receives shared information, in which plural pieces of communication channel information obtained from each master station are combined, from the wireless communication device of said slave station, stops the communications, which have previously been performed through the frequency channel, based on the shared information, and switches to a frequency channel different from those of the wireless communication device of said other master station and said other wireless system.

2. The wireless communication system according to claim 1, wherein the wireless communication device of said slave station becomes a wireless communication device of a master station according to a communication condition.

3. The wireless communication system according to claim 1, wherein the wireless communication device of said master station becomes a wireless communication device of a slave station according to a communication condition.

4. The wireless communication system according to claim 1, wherein the wireless communication devices of said plurality of master stations simultaneously perform checking of detection of the wireless signal of said other wireless system.

5. The wireless communication system according to claim 1, wherein the wireless signal of said other wireless system is a radar wave signal, and said wireless communication system is a wireless LAN (Local Area Network) that shares the frequency band width said other wireless system.

6. A wireless communication device with which a wireless communication system that shares a frequency band with another wireless system is provided, said wireless communication device comprising:

a memory; and a microprocessor coupled to the memory, the microprocessor being configured to execute an application stored in the memory to perform a process comprising:

communicating with a wireless communication device of a slave station;

controlling in a way of, when said communicating step detects a wireless signal of said other wireless system and stops communications which has been being performed till then via a frequency channel, commanding the wireless communication device of said slave station which has been performing wireless communications by using this frequency channel to switch its connection destination to a wireless communication device of another master station that performs communications using a different frequency channel via said the communicating step, and wherein the controlling step includes:

transmitting communication channel information, which shows a frequency channel used for communications of its own device and a frequency channel through which the wireless signal of said other wireless system is detected, to the wireless communication device of said slave station;

receiving shared information, in which plural pieces of communication channel information obtained from each master station are combined, from the wireless communication device of said slave station;

stopping the communications, which have previously been performed through the frequency channel, based on the shared information, and switching to a frequency channel different from those of the wireless communication device of said other master station and said other wireless system.

* * * * *